US012690507B2

(12) United States Patent
Defruyt

(10) Patent No.: US 12,690,507 B2
(45) Date of Patent: Jul. 28, 2026

(54) TRACTOR-TRAILER COMBINATION, TRACTOR AND TRAILER THEREOF

(71) Applicant: CNH Industrial America LLC, New Holland, PA (US)

(72) Inventor: Bert Defruyt, Mannekensvere (BE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 1001 days.

(21) Appl. No.: 17/781,257

(22) PCT Filed: Nov. 30, 2020

(86) PCT No.: PCT/EP2020/083898
§ 371 (c)(1),
(2) Date: May 31, 2022

(87) PCT Pub. No.: WO2021/105498
PCT Pub. Date: Jun. 3, 2021

(65) Prior Publication Data
US 2022/0408626 A1     Dec. 29, 2022

(30) Foreign Application Priority Data
Nov. 28, 2019   (IT) ......................... 102019000022386

(51) Int. Cl.
*A01B 59/043*     (2006.01)
*A01B 63/14*     (2006.01)

(52) U.S. Cl.
CPC ............ *A01B 59/043* (2013.01); *A01B 63/14* (2013.01)

(58) Field of Classification Search
CPC ...... A01B 59/043; A01B 63/14; A01B 71/066
See application file for complete search history.

(56) References Cited

U.S. PATENT DOCUMENTS 3,908,398 A * 9/1975 Braunberger ........ A01D 69/002
                                                    74/15.69
2019/0126912 A1 5/2019 Peterson et al.

FOREIGN PATENT DOCUMENTS

EP         2907368       8/2015
EP         3363274       8/2018
WO      2018185261      10/2018

OTHER PUBLICATIONS

PCT Application No. PCT/EP2020/083898 International Search Report and Written Opinion, dated Mar. 15, 2021, 13 pgs.

* cited by examiner

*Primary Examiner* — Jason D Shanske
*Assistant Examiner* — Al-Birr Rahman Chowdhury
(74) *Attorney, Agent, or Firm* — Fletcher Yoder, P.C.

(57)          ABSTRACT

A tractor-trailer combination includes a tractor configured to carry a trailer and being provided with a three points hitch assembly including elements configured to connect the tractor with the trailer. The tractor-trailer combination also includes other connecting elements interposed between the tractor and the trailer for operatively connecting these together. Each of the tractor and the trailer includes a respective electronic control unit. The trailer electronic control unit, when coupled to the tractor electronic control unit, is configured to automatically adjust the position of the elements of the three points hitch assembly to avoid collision with the other connecting elements during the relative movement between the tractor and the trailer.

13 Claims, 2 Drawing Sheets

TRACTOR-TRAILER COMBINATION, TRACTOR AND TRAILER THEREOF

CROSS-REFERENCE TO RELATED APPLICATIONS

This application is a national stage of PCT Application No. PCT/EP2020/083898, entitled "IMPROVED TRACTOR-TRAILER COMBINATION, TRACTOR AND TRAILER THEREOF," filed on Nov. 30, 2020, which claims priority to Italian Patent Application No. 102019000022386, filed on Nov. 28, 2019.

TECHNICAL FIELD

The present invention concerns an agricultural vehicle, in particular an improved tractor-trailer combination for agricultural use and to a tractor and a trailer suitable for being used in such tractor trailer combination.

BACKGROUND OF THE INVENTION

Agricultural vehicle such as tractors are provided with connections means for allowing the connection of an implement to the tractor. Indeed, tractor-implement combinations are widely known and used for a plurality of different working operations in the fields.

The aforementioned connection means are usually provided in form of a three points hitch assembly. Such three points hitch assembly may be realized in different ways, as described hereinafter.

Briefly, a three points hitch assembly may comprises a cassette configured to carry in movable manner a first hitch point element. Such cassette is carried by tractor's body in a movable manner, usually by a hinge connection realized in its inner portion with respect to the tractor. Accordingly, the first hitch point element is carried on an outer portion opposed with respect to the inner portion and it is configured to move up and down according to the circumferential path defined by the aforementioned hinge connection. Alternatively, such first hitch point element may be defined by a drawbar which directly connected the tractor with the implement.

Furthermore, the three points hitch assembly comprises two lateral arms, comprising a first portion hinged to the tractor's body and a second portion carrying respectively a second and a third hitch point elements for further connecting the tractor with a compliant implement. The two lateral arms are positioned in an outer position with respect to the cassette supporting the first hitch point.

In addition, a three points hitch assembly further defines a power take off (PTO), usually realized in form of a protruding shaft extending from tractor's body above the above defined cassette and in a substantially equally distant position with respect to lateral arms.

Many implements are single-point trailers, which are therefore connected via a drawbar to the hitch point carried by the cassette of the tractor. Then, the PTO is connected by a PTO shaft to the implement for providing the needed power for its operation.

According to the above described configuration, it is clear that during steering maneuvers the lateral arms may collide with the PTO shaft or the drawbar. Such collision may lead to bend the PTO shaft or to damages to other hydraulic or electric connections, that involves high costs for repairing and imposes a long stop of the working activities of the tractor-trailer combination.

Accordingly, when the user couples the trailer to the tractor he should also adjust the height of the lateral arms so that they cannot collide with the aforementioned coupling elements.

However, it is clear that such operation is manual and accordingly needs time and can be omitted by the user, thereby leading to unwanted and dangerous contact during steering maneuvers of the tractor-trailer combination.

Furthermore, the use of automatic/autonomous tractor-trailer combination is more and more felt in the agricultural field. Accordingly, a manual adjusting procedure as described above is incompatible with an automatic/autonomous tractor-trailer combination.

In view of the above, the need is felt to provide a tractor-trailer combination into which the lateral arms of the three points hitch assembly do not interfere with other elements of the tractor-trailer combination during its operation.

An aim of the present invention is to satisfy the above mentioned needs in an economic and optimized way.

SUMMARY OF THE INVENTION

The aforementioned aim is reached by a tractor-trailer combination for agricultural use and to a tractor and a trailer suitable for being used in such tractor trailer combination and a related control method as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
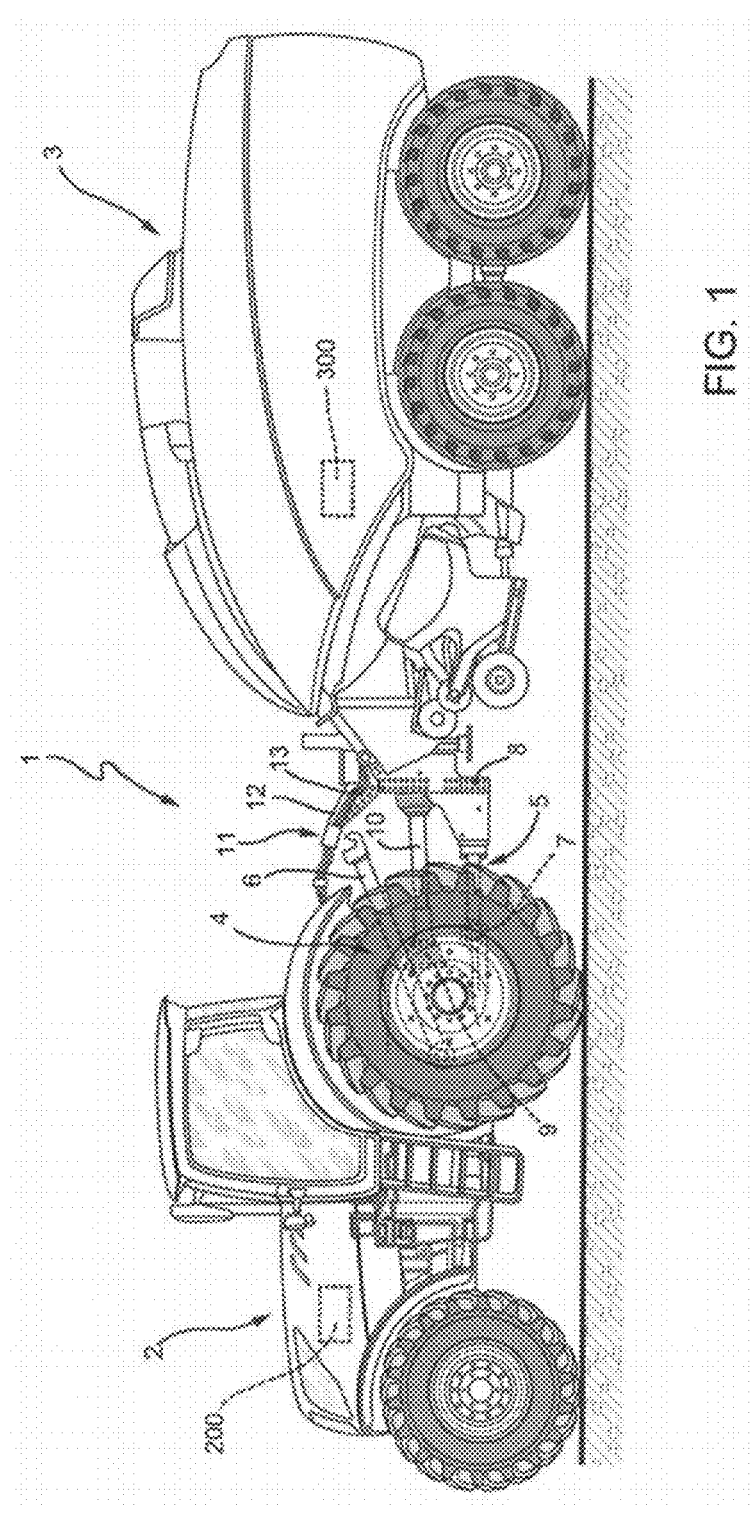
FIG. 1 is a lateral schematic view showing a first exemplarily tractor-trailer combination according to the invention, with parts removed for sake of clarity.
Figure 2:
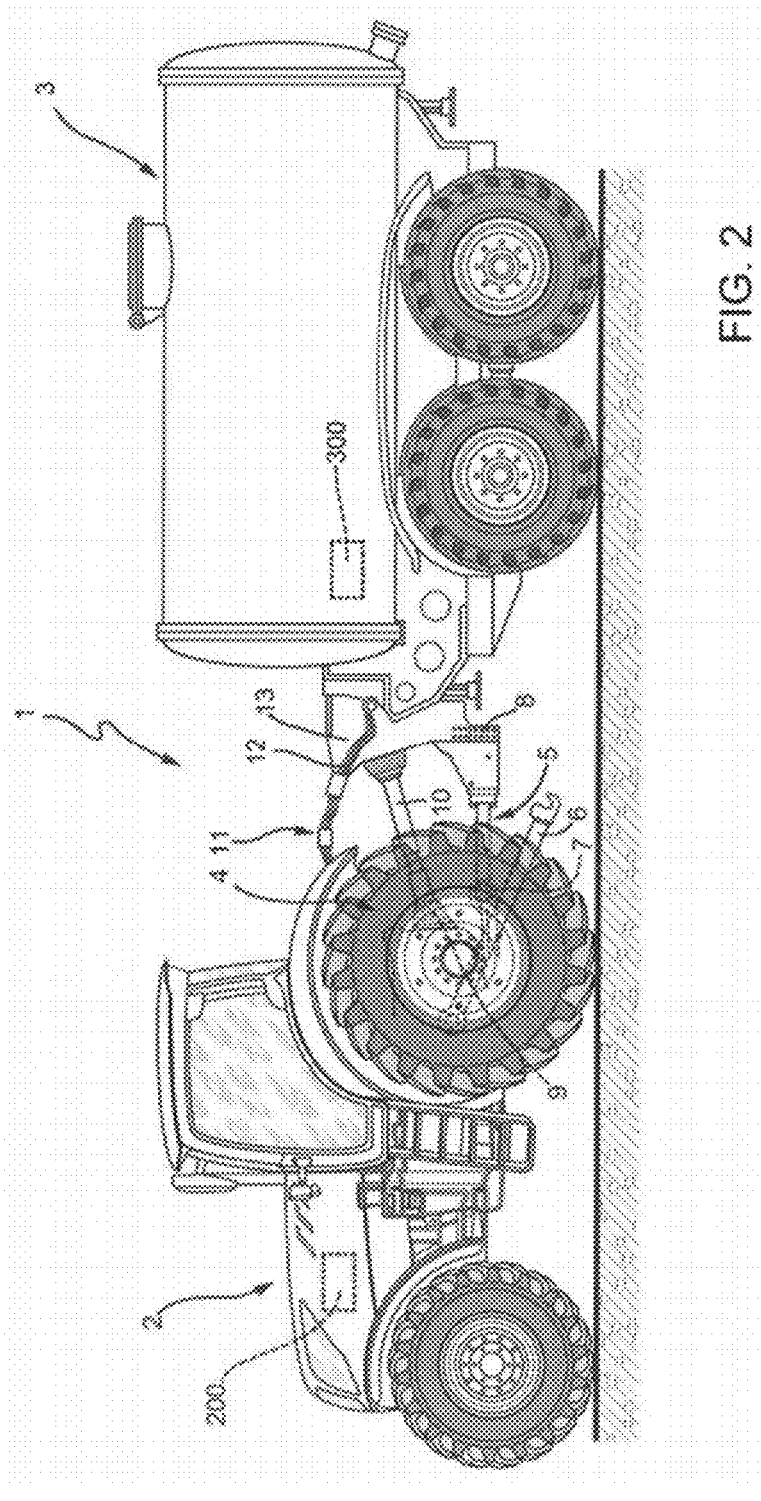
FIG. 2 is a lateral schematic view showing a second exemplarily tractor-trailer combination according to the invention, with parts removed for sake of clarity.

FIGS. 1 and 2 both show an exemplarily tractor-trailer combination 1 comprising a tractor 2 and a trailer 3 carried by tractor 2.

In particular, tractor 2 is provided with a three points hitch assembly 4 comprising, as known, a first hitch point 5 and a pair of side arms 6. Always as known, the first hitch point 5 is carried by a cassette (not shown) pivotally linked to tractor's body while side arms 6 comprises each an inner portion hinged to the tractor's body and an outer portion extending towards the trailer 3. The outer portion of each side arm 6 defines a respective hitch point for connecting with a compatible implement.

According to the describe exemplarily tractor-trailer combination 1 the first hitch point 5 comprises a drawbar 7 configured to be coupled to a respective coupling element 8 carried by the trailer 3.

Moreover, the tractor 2 comprises a plurality of other connecting elements configured to operatively connect the tractor 2 to the trailer 3 to provide mechanic, hydraulic or electric power from the tractor 2 to the trailer 3 to allow its operation.

In the described example, the tractor 2 defines a power take off (PTO) 9 coupled to the trailer 3 via a PTO shaft 10 further connecting the tractor 2 to trailer 3. The PTO shaft 10 is used to transmit power to the trailer 3 by delivering torque provided at the PTO 9 by an engine/motor of tractor 2.

The described tractor-trailer combination 1 further comprises a hydraulic and electric connection 11 between the tractor 2 and the trailer 3. In the exemplarily disclosed configuration, such hydraulic and electric connection 11 comprises connection pipes and cables 12 fixed at one side to an appendix (not shown) of the tractor 2 protruding towards the trailer 2 and at the opposite side to an appendix 13 of the trailer 3 protruding to tractor 2.

As known and therefore briefly reported for sake of completeness, the side arms 6 are carried by the tractor laterally with respect to first hitch point 5, PTO 9, PTO shaft 10 and, when present, hydraulic and electric connection 11. Accordingly, first hitch point 5, PTO 9, PTO shaft 10 and, when present, hydraulic and electric connection 11 are located in a space laterally comprised by the side arms 6.

As furthermore known, the side arms 6 and the cassette carrying the first hitch point 5 are pivoted about their respective hinge by a dedicated actuator (not shown), usually a hydraulic actuator such a cylinder, controlled by an electronic control unit 200 of the tractor 2, e.g. the ECU of the tractor 2.

The trailer is itself provided with an electronic unit 300 configured to control the peculiar operation of the trailer, e.g. the formation of a bale, the movement of a peculiar blade, or to adjust the dispensing of fluids or solid material to the fields.

According to one aspect of the invention, the trailer electronic control unit 300 is configured to communicate electrically with the tractor electronic control unit 200 to adjust the height of the elements of the three points hitch assembly 4 so that they cannot interfere with the other connecting elements interposed between the tractor 2 and the trailer 3, when these latter steers one with respect to the other.

According to the described embodiment, the position of the side arms 6 of the three points hitch assembly 4 is adjusted so that they cannot interfere with the PTO 10 or the hydraulic-electric connection 11 during any possible steering movement between these latter.

In particular, the trailer electronic control unit 300 communicates with a physical memory of the trailer (2), namely a RAM (Random Access Memory) or any other type of physical memory for example SRAM, DRAM, SODIMM etc, configured to memorize data related to the dimensions of trailer 3 and to receive data related to the dimensions of the tractor 2 and of the three points hitch assembly 4 and to elaborate the aforementioned data to define a suitable position of the side arms 6 of the three points hitch assembly 4 of the tractor 2; then the trailer electronic control unit 300 is configured to send a signal to tractor's actuators to control consequently the movement of side arms until they reach the aforementioned suitable position. Preferably, such control of trailer electronic control unit 300 is imparted via tractor's control unit 200.

Advantageously, the trailer may use TIM (tractor implement management) functionalities to control the actuators for maneuvering three points hitch side arms 6. Therefore, the trailer control unit 300 can communicate with an ISO-BUS communication standard, as provided by TIM functionalities, with tractor control unit 200. Preferably, the communication standard is an ISOBUS Class 3, AEF (Agricultural Industry Electronics Foundation) security protocol communication standard.

The communication between the trailer control unit 300 and the tractor control unit 200 may be realized by wire, e.g. thanks to an electronic connection thanks to a cable carried by the above mentioned hydraulic-electric connection 11 or wireless, e.g. thanks to electromagnetic signals, as known.

The operation of a tractor-trailer combination 1, the tractor 2 and the trailer 3 as described above is the following.

In the situation of FIG. 1 the trailer 3 defines a high point connection for connecting the PTO shaft to the trailer 3. Accordingly, the trailer control unit 300 will recognize the typology of tractor 2 and will control side arms 6 so that the arms 6 will be placed at their minimum height position, in order to avoid any possible collision with the other connection elements placed between tractor 2 and trailer 3.

In the situation of FIG. 2 the trailer 3 defines a low point connection for connecting the PTO shaft to the trailer 3. Accordingly, the trailer control unit 300 will recognize the typology of tractor 2 and will control side arms 6 so that the arms 6 will be placed at their maximum height, in order to avoid any possible collision with the other connection elements placed between tractor 2 and trailer 3.

In view of the above, the present invention is directed to a method for controlling, directly from a trailer connected to a tractor, tractor's actuators to adjust the position of three points hitch elements carried by the tractor. Such method comprises the following phases:

Electronically connecting the trailer electronic control 300 with tractor electronic control unit 200;

The trailer electronic control unit 300 acquires dimensional data related to the tractor 2;

The trailer electronic control unit 300 compares the acquired data of tractor 2 with data related to the dimension of the trailer 3;

The trailer electronic control unit 300 computes an optimized position of the elements 6 of the three points hitch assembly 4 with respect to said tractor 2 in order to avoid the collision of these three points hitch assembly elements with any other connection elements 10, 11 provided between the tractor 2 and the trailer 3;

The trailer electronic control unit 300 control tractor's actuators to adjust the position of three points hitch elements according to the value calculated at the preceding points.

The trailer electronic control unit 300 may directly control the above mentioned actuators of tractor 2 or may control them through the tractor electronic control unit 200.

As said, the communication between the electronic control units of trailer and tractor 300, 200 may perform TIM functionalities via an ISOBUS protocol.

In view of the foregoing, the advantages of tractor-trailer combination for agricultural use and to a tractor and a trailer suitable for being used in such tractor-trailer combination and a related control method according to the invention are apparent.

Thanks to the proposed tractor-trailer combination 1, the user of the tractor 2 should not every time adjust the position of side bars 6 of the three points hitch assembly. Such adjustment is realized in an automatic way, in the best possible position according to the specific configuration of tractor-trailer 1.

Accordingly, the consequent possible collisions of pick up hitch elements can be avoided, thereby decreasing the consequent repairing costs and the loss of time.

Furthermore, the proposed tractor-trailer combination 1 and the related control method can be easily implemented into automatic and autonomous tractors and trailers.

It is clear that modifications can be made to tractor-trailer combination for agricultural use and to a tractor and a trailer suitable for being used in such tractor trailer combination and the related control method that do not extend beyond the scope of protection defined by the claims.

For example, the disclosed shapes of three points hitch assembly 4 may vary, such as the disclosed shapes and typology of tractor 2, trailer 3, and the elements interposed there between.

The invention claimed is:

1. A tractor-trailer combination comprising:
a trailer;
a tractor configured to carry the trailer, the tractor being provided with a three points hitch assembly comprising elements configured to connect the tractor with the trailer, the elements of the three points hitch assembly comprising lateral side arms hinged to the tractor and extending toward the trailer, the tractor comprising an actuator configured to set a position of the lateral side arms; and
a plurality of other connecting elements configured to operatively connect the tractor and the trailer, the tractor and the trailer each comprising a respective electronic control unit, the electronic control unit of the trailer being configured to communicate with the electronic control unit of the tractor to receive dimensional data related to the tractor and to elaborate the received dimensional data related to the tractor with dimensional data of the trailer stored in a physical memory of the trailer, and the electronic control unit of the trailer being further configured to control the actuator to set the position of the lateral side arms with respect to the tractor while the lateral side arms are not coupled to the trailer so that the lateral side arms do not interfere with the other connecting elements when the tractor and the trailer steer one with respect to the other.

2. The tractor-trailer combination according to claim 1, wherein the other connecting elements comprise:
a PTO shaft connecting the tractor to the trailer to provide mechanical power; and
a hydraulic and electric connection connecting the tractor to the trailer to provide hydraulic and/or electric power.

3. The tractor-trailer combination according to claim 1, wherein the electronic control unit of the trailer controls the actuator of the three points hitch assembly using a Tractor Implement Management (TIM) protocol.

4. The tractor-trailer combination according to claim 1, wherein the electronic control unit of the trailer and the electronic control unit of the tractor communicate electronically using an ISOBUS communication standard.

5. The tractor-trailer combination according to claim 1, wherein the electronic control unit of the trailer directly controls the actuator.

6. The tractor-trailer combination according to claim 1, wherein the electronic control unit of the trailer controls the actuator via the electronic control unit of the tractor.

7. A method for controlling the actuator to adjust the position of the lateral side arms, as claimed in claim 1, the method comprising the following phases:
electronically connecting the electronic control unit of the trailer with the electronic control unit of the tractor;
receiving, via the electronic control unit of the trailer, the dimensional data related to the tractor;

comparing, via the electronic control unit of the trailer, the received dimensional data related to the tractor with the dimensional data of the trailer stored in the physical memory of the trailer;
determining, via the electronic control unit of the trailer, a suitable position of the lateral side arms with respect to the tractor while the lateral side arms are not coupled to the trailer to avoid collision of the lateral side arms with any of the other connection elements; and
controlling, via the electronic control unit of the tractor, the actuator to adjust the position of the lateral side arms according to the suitable position of the lateral side arms.

8. The method according to claim 7, wherein the electronic control unit of the trailer directly controls the actuator.

9. The method according to claim 7, wherein the electronic control unit of the trailer controls the actuator via the electronic control unit of the tractor.

10. The method according to claim 7, wherein the electronic control unit of the trailer communicates with the electronic control unit of the tractor using a Tractor Implement Management (TIM) protocol.

11. The method according to claim 7, wherein the electronic control unit of the trailer and the electronic control unit of the tractor communicate electronically using an ISOBUS communication standard.

12. A trailer configured to be attached to a tractor to form a tractor-trailer combination, the tractor being provided with a three points hitch assembly comprising elements configured to connect the tractor with the trailer, the elements of the three points hitch assembly comprising lateral side arms hinged to the tractor and extending toward the trailer, the tractor comprising an actuator configured to set a position of the lateral side arms, the tractor and the trailer comprising a plurality of other connecting elements configured to operatively connect the tractor and the trailer, the tractor and the trailer each comprising a respective electronic control unit, the electronic control unit of the trailer being configured to communicate with the electronic control unit of the tractor to receive dimensional data related to the tractor when the trailer is attached to the tractor and to elaborate the received dimensional data related to the tractor with dimensional data of the trailer stored in a physical memory of the trailer, and the electronic control unit of the trailer being further configured to control the actuator to set the position of the lateral side arms with respect to the tractor while the lateral side arms are not coupled to the trailer so that the lateral side arms do not interfere with the other connecting elements when the tractor and the trailer are attached and steer one with respect to the other.

13. A tractor configured to attach to a trailer to form a tractor-trailer combination, the tractor being provided with a three points hitch assembly comprising elements configured to connect the tractor with the trailer, the elements of the three points hitch assembly comprising lateral side arms hinged to the tractor and extending toward the trailer, the tractor comprising an actuator configured to set a position of the lateral side arms, the tractor and the trailer comprising a plurality of other connecting elements configured to operatively connect the tractor and the trailer, the tractor and the trailer each comprising a respective electronic control unit, the electronic control unit of the tractor being configured to communicate with the electronic control unit of the trailer to send dimensional data related to the tractor when the trailer is attached to the tractor, the electronic control unit of the tractor being further configured to receive instructions from the electronic control unit of the trailer for controlling the actuator for setting the position of the lateral side arms with respect to the tractor while the lateral side arms are not coupled to the trailer so that the lateral side arms do not interfere with the other connecting elements when the tractor and the trailer are attached and steer one with respect to the other.

\*　\*　\*　\*　\*